(12) United States Patent
Saucray et al.

(10) Patent No.: US 9,085,372 B2
(45) Date of Patent: Jul. 21, 2015

(54) AIRCRAFT COMPRISING AT LEAST ONE ENGINE HAVING CONTRA-ROTATING ROTORS

(75) Inventors: Jean-Michel Saucray, Villeneuve les Bouloues (FR); Philippe Chareyre, La Salvetat Saint Gilles (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 870 days.

(21) Appl. No.: 13/055,305

(22) PCT Filed: Jul. 21, 2009

(86) PCT No.: PCT/FR2009/051463
§ 371 (c)(1),
(2), (4) Date: Apr. 25, 2011

(87) PCT Pub. No.: WO2010/010292
PCT Pub. Date: Jan. 28, 2010

(65) Prior Publication Data
US 2011/0198440 A1 Aug. 18, 2011

(30) Foreign Application Priority Data
Jul. 24, 2008 (FR) ...................................... 08 55062

(51) Int. Cl.
*B64D 31/12* (2006.01)
(52) U.S. Cl.
CPC ...................................... *B64D 31/12* (2013.01)
(58) Field of Classification Search
None
See application file for complete search history.

(56) References Cited

U.S. PATENT DOCUMENTS

| | | | |
|---|---|---|---|
| 4,255,083 A * | 3/1981 | Andre et al. | 415/119 |
| 4,419,045 A * | 12/1983 | Andre et al. | 415/119 |
| 4,689,821 A | 8/1987 | Salikuddin et al. | |
| 5,221,185 A | 6/1993 | Pla et al. | |
| 5,490,436 A | 2/1996 | Coyne et al. | |
| 7,958,801 B2 * | 6/2011 | Frederickson | 74/572.2 |
| 7,967,239 B2 * | 6/2011 | Cotton et al. | 244/17.19 |
| 2005/0065712 A1 | 3/2005 | Skilton | |
| 2011/0198440 A1* | 8/2011 | Saucray et al. | 244/69 |

FOREIGN PATENT DOCUMENTS

| | | |
|---|---|---|
| CN | 2102882 U | 4/1992 |
| EP | 1 296 082 A2 | 3/2003 |
| GB | 2 275 984 A | 9/1994 |
| GB | 2 305 488 A | 4/1997 |
| WO | WO 2005/042959 A2 | 5/2005 |
| WO | WO 2006/017201 A1 | 2/2006 |
| WO | WO 2008/079431 A2 | 7/2008 |

OTHER PUBLICATIONS

International Search Report dated Jan. 18, 2010 in Intemaional Patent Application No. PCT/FR2009/051463 (with translation).
French Search Report dated Mar. 10, 2009 in French Patent Application No. 0855062.
Written Opinion of the International Searching Authority issued in International Patent Application No. PCT/FR2009/051463 dated Jan. 18, 2010.

* cited by examiner

*Primary Examiner* — Valentina Xavier
(74) *Attorney, Agent, or Firm* — Dickinson Wright PLLC (57) ABSTRACT

The aircraft includes at least one engine having contra-rotating rotors, the engine or at least one of the engines having imbalances associated with at least one ellipse. The aircraft includes a means capable of controlling the engine or at least one of the engines such that, at a given engine speed, the large axis of the ellipse or at least one of the ellipses extends in a direction for which the vibrations generated by the engine or engines have a minimum intensity in at least one predetermined site, particularly in a predetermined area, of the aircraft.

10 Claims, 5 Drawing Sheets

AIRCRAFT COMPRISING AT LEAST ONE ENGINE HAVING CONTRA-ROTATING ROTORS

FIELD OF THE INVENTION

The invention relates to aircraft comprising at least one engine having contra-rotating rotors.

It may be an engine with contra-rotating propellers such as a propfan type turboprop, or an engine of a rotary-wing aircraft such as a helicopter.

BACKGROUND OF THE INVENTION

In the air transport industry, research studies have been conducted for many years to reduce the vibrations and noise produced by the engines. Various techniques have been used.

Passive or active balancing techniques are also known, in which the inertial or aerodynamic unbalance is measured and corrected, as is the case for example in document WO-2006/017201.

Other "synchrophasing" techniques are also known, where synchrophasing between several engines limits the noise generated at the blade passing frequency, as is the case for example in documents U.S. Pat. No. 4,689,821, US-2005/0065712, WO-2005/042959 and US-00/5221185. The main problem with these techniques for balancing and synchrophasing by the engine control system is that the control system delay must be much less than the period separating the passage of two blades in front of the sensor used. This is never the case, however, which means that no industrial applications can be considered.

Techniques to filter and attenuate the vibrations generated in the aircraft are also known. They consist for example of active or semi-active systems with active weights, variable stiffness or rheological fluids (as described in document U.S. Pat. No. 5,490,436). These techniques also include systems equipped with sensors and control architectures to command active or semi-active actions. These techniques have been developed to limit the impact of unbalance forces on the supporting structure.

Figure 1:
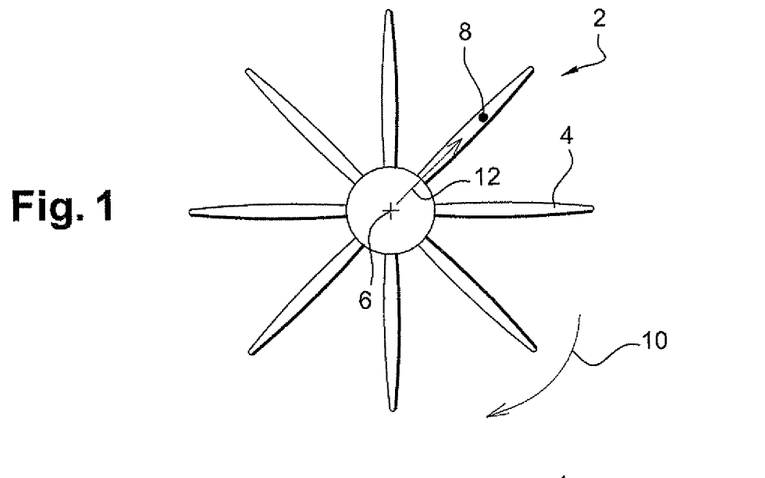
FIGS. 1 and 2 are front and perspective views respectively of a rotating disc of the prior art.

In reference to FIG. 1, we will first describe the unbalance problem for a single rotating disc. This figure shows a disc forming a propeller 2 comprising blades 4, in this case eight. The propeller can rotate freely around an axis 6 corresponding to its main geometric axis of symmetry. We assume that the propeller has a balancing fault such that the center of gravity of the propeller is not on axis 6 but is shifted radially from it. This center of gravity 8 is for example located on one of the blades 4, as shown, rather exaggerated, on FIG. 1. We assume that the propeller is rotated around its axis 6 in the direction shown by the arrow 10. The center of gravity 8 therefore generates an unbalance force 12 exerted on the propeller on the axis 6 in the plane of the disc along a radial direction towards the outside and passing through point 8. This force rotates in direction 10. It is an inertial unbalance. Consequently, for any rotating disc whose center of inertia does not coincide with the center of rotation, an inertial unbalance produces a radial force in the plane of the disc as shown on FIG. 1.

Figure 2:
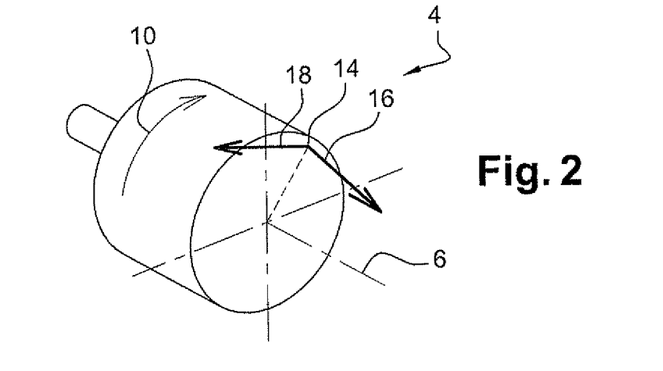

In reference to FIG. 2, there may also be an aerodynamic unbalance. This is the case when the moving disc comprises bearing surfaces such as the faces of propeller blades. A setting fault or a shape fault on the bearing surfaces may therefore generate an aerodynamic unbalance. There could also be a problem of dispersion of aerodynamic deformation of the blades or of dispersion of the blade pitch. The aerodynamic unbalance force is exerted at a point 14 located away from axis 6. The unbalance force is composed firstly of a traction force increment referenced 16 on FIG. 2 and located outside the plane of the propeller disc, and a drag force increment 18 located in the plane of the propeller disc.

Figure 3:
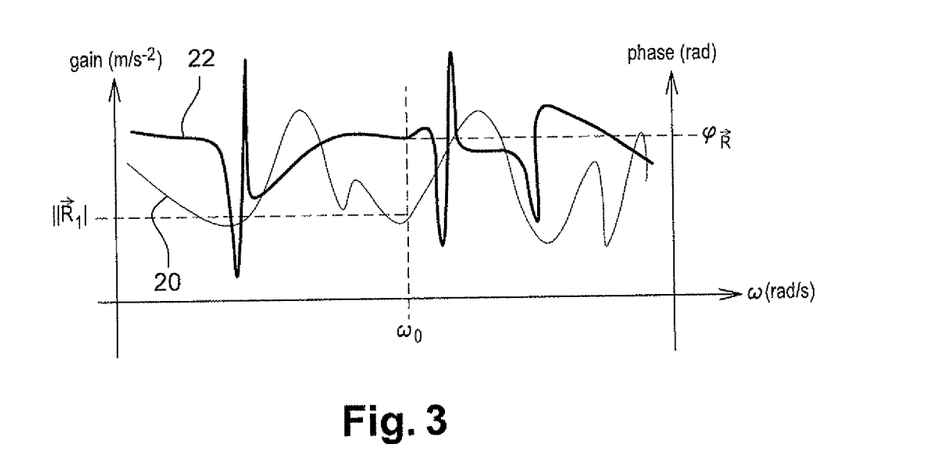
FIG. 3 shows a graph of the gain and phase of an unbalance force as a function of the speed of the rotating disc of FIG. 1.

We will now describe some balancing techniques in greater detail. We know in fact how to measure the unbalance forces of a rotating machine (or of a rotating disc), distinguishing between the amplitude and the phase angle of the force with respect to a fixed axis. One of these techniques is as follows for example. To eliminate the vibrations at a specific speed of rotation, we first measure the unbalance characteristics of the rotating machine. We therefore measure or calculate the unbalance forces it produces. These forces are characterized by a sinusoidal excitation in the engine speed frequency range in a fixed reference coordinate system with respect to the rotating part, for example related to the supporting structure. These excitations are generally measured using an engine vibration sensor (e.g. an accelerometer) or a set of dedicated accelerometers. The unbalance of a rotating disc is therefore represented by the measured acceleration R1 in terms of amplitude (gain) and phase ($\phi$) in the axis of the fixed supporting structure at the machine speed of rotation $\omega_o$ as shown on FIG. 3. This figure shows on a first curve 20 the graph of gain (in m/s$^{-2}$) against speed of rotation $\omega$ (in rad/s), and on the second curve 22 the graph of phase $\phi$ (in radians) against this speed.

The following measurement method, called the vector influence coefficient method, can be used. After measuring the initial acceleration R1, which represents the result of the action of the unbalance required, unbalance masses of known weight are added to the rotating system to measure their effect on the measured acceleration. For example, an unbalance of unit mass is added to the disc at phase angle 0° and a new acceleration R2 (gain and phase) at speed $\omega_o$ is measured.

Figure 4:
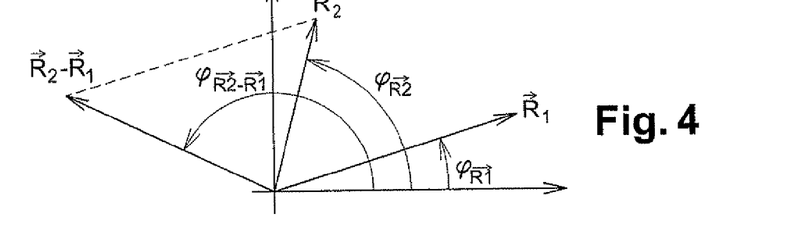
FIGS. 4 to 6 are diagrams showing, in vector form, unbalance forces in the disc of FIG. 1.

We then calculate a vector solution as follows:
the original unbalance b1 causes acceleration R1,
the set (b1+b2) forming the sum of the original unbalance and of the unit unbalance causes an acceleration R2,
by deduction, the unit unbalance b2 therefore generates the acceleration R2-R1. Concerning this subject, we refer to FIG. 4 which shows in an orthonormal coordinate system the vectors R1, R2 and R2−R1 which have respectively phases $\phi$R1, $\phi$R2 and $\phi$(R2−R1).

Note here that this calculation method assumes that there is a linear relation between the unbalance and the corresponding measured acceleration.

The original unbalance and the correction mass required as a result are therefore calculated as follows:

$$\begin{cases} \|\vec{b}_1\| = \|\vec{b}_2\| \cdot \dfrac{\|\vec{R}_1\|}{\|\vec{R}_2 - \vec{R}_1\|} \\ \varphi_{\vec{b}_1} = \varphi_{\vec{b}_2} + \varphi_{\vec{R}_1} - \varphi_{\vec{R}_2 - \vec{R}_1} \end{cases}$$

To obtain better results and minimize the measurement errors, several steps of adding weights and measuring accelerations, with accelerations R3 and R4 for example, can be carried out.

Note that the inertial and aerodynamic unbalances may have to be measured separately. The above-mentioned technique can be used to do this, providing in addition that modifications of the speed of rotation and independent modifications of the torque request can be made, in order to distinguish between the source of unbalance due to inertia and the source of unbalance due to the aerodynamic characteristics of the rotor.

Similarly, when the rotating machine comprises two or more rotors, the same approach can be reproduced for each rotor disc one after the other. In this case, unbalance diagnostic software programs supply balancing solution vectors which include one solution vector for the first rotor and one solution vector for the second rotor. Each solution vector includes a modulus and a phase angle. This operation will be carried out to characterize the inertial unbalance and then to characterize the aerodynamic unbalance.

Figure 5:
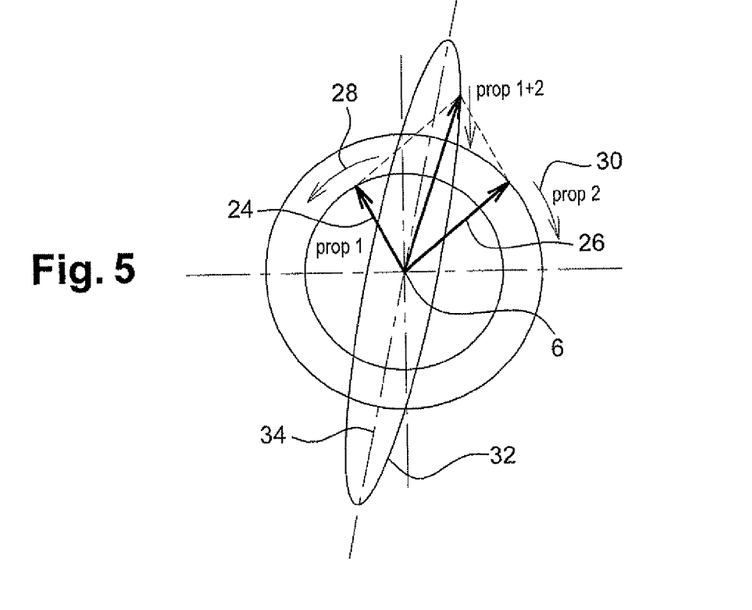

We will now describe, in reference to FIG. 5, the problem of unbalance of two contra-rotating discs. As for a single disc, with two contra-rotating discs, the inertial unbalance of each disc produces a radial force in the plane of the corresponding disc. FIG. 5 shows these forces PROP1 24 and PROP2 26 which are exerted at the axis of rotation 6 common to the two discs. The two discs rotate in different directions, indicated respectively 28 and 30 on FIG. 5. The unbalance forces 24 and 26 also rotate in opposite directions, respectively 28 and 30.

We now consider the force PROP 1+2 resulting from the sum of the two unbalance forces PROP1 and PROP2 as observed from the sump of the rotating machine or its supporting structure. The modulus of this resultant force varies depending on the relative position of the discs. Over time, this modulus describes an ellipse 32 centered on the axis 6, whose minor axis is equal to the difference between the moduli of forces PROP1 and PROP2 and a major axis 34 equal to the sum of the two moduli.

We now consider the special case wherein the moduli of the two forces PROP1 and PROP2 are equal. Consequently, the length of the minor axis of the ellipse is zero and the resultant force PROP 1+2 is equal to the sum of the moduli of the two forces, making it a pure oscillating impact force. The ellipse is therefore reduced to a line segment. For example, if we assume that phase $\phi$ is equal to 0 when the two radial forces PROP1 (or $R_{disc1}$) and PROP2 (or $R_{disc2}$) are in phase, the resultant radial force R can be described as follows:

$R(\omega t) = R_{disc1}(\omega t) + R_{disc2}(\omega t)$ $R(\omega t + \pi/2) = R_{disc1}(\omega t + \pi/2) - R_{disc2}(\omega t + \pi/2)$ $R(\omega t + \pi) = -[R_{disc1}(\omega t) + R_{disc2}(\omega t)]$ $R(\omega t + 3\pi/2) = R_{disc2}(\omega t + 3\pi/2) - R_{disc1}(\omega t + 3\pi/2)$ In addition, the resultant moment M outside the plane can be described as follows:

$M(\omega t) = 0$ $M(\omega t + \pi/2) = [R_{disc1}(\omega t) + R_{disc2}(\omega t)] * \text{leverarm}$ $M(\omega t + \pi) = 0$ $M(\omega t + 3\pi/2) = -[R_{disc1}(\omega t) + R_{disc2}(\omega t)] * \text{leverarm}$ The moment located outside the plane is expressed at the center of the disc 1 for example. In addition, the lever arm is the axial distance between the planes of discs 1 and 2.

The direction of the major axis of the ellipse depends on the relative phase between the unbalance forces PROP1 and PROP2. For example, if the positions of the two discs are such that the two forces are in phase in the vertical axis, the maximum excitation in the plane of the discs will be directed vertically. In contrast, if the positions of the two discs are such that the two forces are in phase opposition (180° shift) in the vertical direction, the maximum excitation in the plane of the discs will be directed horizontally.

Figure 6:
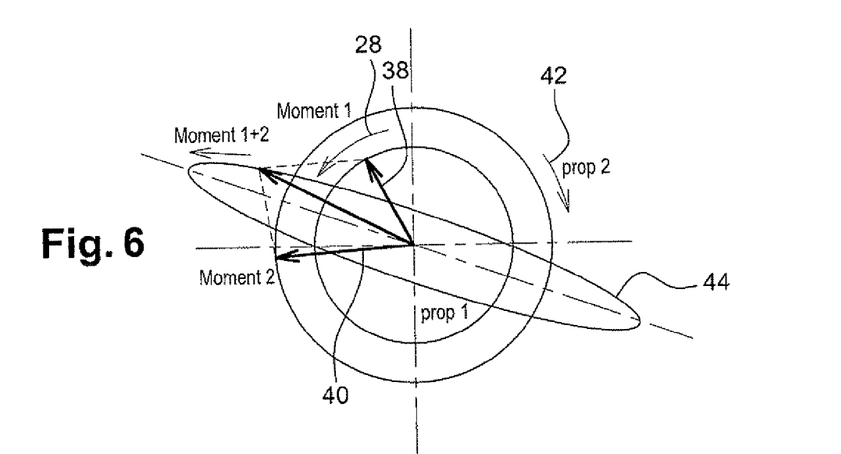

When the two contra-rotating discs incorporate aerodynamic bearing surfaces, the forces located outside the planes of the discs generate moments passing through the center of rotation of each disc. Consequently, as with the case of the inertial unbalance, the principle of vector summing described for the radial forces is applicable for the moments generated by the aerodynamic unbalance forces as shown on FIG. 6. This figure shows Moment 1 referenced 38 associated with disc 1 rotating in direction 28 and Moment 2 referenced 40 associated with disc 2 and rotating in direction 42. The vector sum Moments 1+2 of the two moments describes an ellipse 44.

Whether in case of inertial unbalance or aerodynamic unbalance, when the two discs rotate at the same speed, the major axis of the ellipse remains fixed with respect to a fixed axis corresponding for example to the engine supporting structure. Inversely, if the speeds of rotation of the discs are not the same, the axis of the ellipse rotates at a speed equal to the difference between the speeds of the two discs.

Note here that in addition to the rotating forces located outside the plane of the discs, local moments are generated between the two planes of the discs. The moduli of these moments depend on the distance between the two rotating discs.

The known vibration reduction techniques prove relatively inefficient, however, especially for engines having contra-rotating rotors.

Object and Summary of the Invention

One objective of the invention is to reduce the vibrations generated in the supporting structure by engines of this type.

The invention therefore provides for an aircraft comprising at least one engine having contra-rotating rotors, the engine or at least one of the engines having unbalances associated with at least one ellipse, the aircraft comprising means capable of controlling the engine or at least one of the engines such that, at a given engine speed, the major axis of the ellipse or at least one of the ellipses extends in a direction for which vibrations generated by the engine or engines have a minimum intensity in at least one predetermined site, particularly in a predetermined area, of the aircraft.

The vibrations produced by the engine or each engine are therefore mainly oriented in a direction in which they will be felt as little as possible at the site, for example from the fuselage. Consequently, we do not try to reduce them at source. The vibrations felt are therefore reduced simply and at low energy cost. Unlike the techniques of the prior art, the invention takes into account the characteristics of the engines, especially through the choice of direction of the major axis of the ellipse. It does not involve adding extra weights (e.g. tuned vibration absorbers) like the known filtering or dissipation techniques, nor introduction into the engine of specific external energy to implement an active function. The vibrations can be minimized at a single site, several sites at a time (using several respective sensors, for example) or in an entire zone corresponding for example to a complete component of the aircraft such as the fuselage.

In one embodiment, the control means are able to control the engine or at least one of the engines such that the major axis of the ellipse or at least one of the ellipses extends in a direction of lower vibration transmissivity in a structure supporting the engine.

Consequently, after identifying the direction of lower vibration transmissivity in the structure, the vibrations are channeled in this direction. They can therefore be dampened very efficiently.

In another embodiment, there are at least two engines and the control means are able to control the engines such that a resultant of the vibrations generated by the engines has minimum intensity at the predetermined site.

The overall vibrations generated by at least two of the engines or the two engines are therefore processed together to minimize their intensity.

In another embodiment, there are at least two engines and the control means are able to control at least one of the engines such that vibrations generated by this engine itself have minimum intensity at the site.

Advantageously, the site is specific to the engine and the control means are able to control the other engine such that the other engine is associated with at least one other predetermined site at which the vibrations generated by this other engine itself have minimum intensity.

This time, the vibrations are attenuated for each individual engine. The engines are therefore processed independently of each other in this respect.

In another embodiment, the control means are able to control the engine or at least one of the engines such that the unbalance forces of the rotors are exerted parallel to an inertia plane of a structure supporting the engine, for example a main inertia plane or the inertia plane which has the largest inertia modulus.

The impact of the vibrations is therefore minimized in the aircraft.

In another embodiment, there are at least two engines and the control means are able to control the engines such that unbalance forces and/or unbalance moments of the respective engines exerted on the aircraft compensate each other at least partially.

Consequently, this compensation also attenuates the vibrations.

The invention also provides for a method for controlling an aircraft comprising at least one engine having contra-rotating rotors, the engine or at least one of the engines having unbalances associated with at least one ellipse, wherein the engine or at least one of the engines is controlled such that, at a given engine speed, the major axis of the ellipse or at least one of the ellipses extends in a direction for which vibrations generated by the engine or engines have a minimum intensity in at least one predetermined site, particularly in a predetermined area, of the aircraft.

The invention also provides for a computer program which includes instructions that can control execution of a method according to the invention when it is executed on a computer, and a data storage medium which includes such program.

BRIEF DESCRIPTION OF THE DRAWINGS

Other characteristics and advantages of the invention will appear on reading the following description of embodiments given as non-limiting examples, and referring to the attached drawings in which.

MORE DETAILED DESCRIPTION

Figure 7:
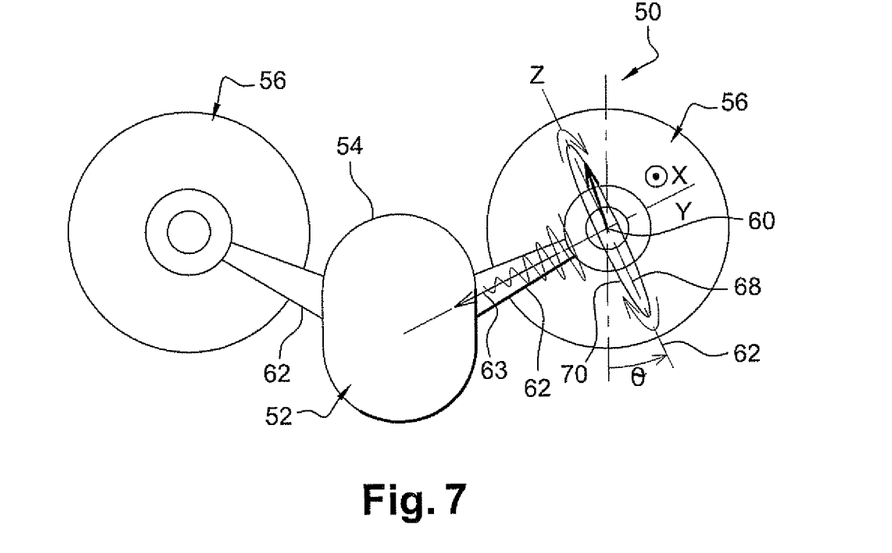
FIGS. 7 and 8 are two diagrammatic elevation views of an aircraft showing two embodiments of the invention respectively.

In reference to FIG. 7, in a first embodiment of the invention, the aircraft 50 comprises a main structure 52 including in particular a fuselage 54. It is assumed in this example that the aircraft comprises engines 56, in this case two, arranged symmetrically with respect to a median vertical plane of the fuselage 54. In this case, each engine 56 is a propfan type turboprop comprising two contra-rotating propellers respectively referenced 58$a$ and 58$b$, shown on FIG. 10. The two propellers extend coaxially with reference to a common axis 60, the front propeller 58$a$ extending in front of the rear propeller 58$b$. The two propellers each have blades 61. They can rotate in respectively opposite directions. Each engine 56 is connected to the fuselage 54 via a respective mast (or pylon) 62.

In this case, we consider an XZY coordinate system as shown on FIG. 7 and fixed with respect to the fuselage 54. Direction Y is parallel to the average fiber of the mast 62 and goes through it. Direction X is horizontal and parallel to the longitudinal direction of the fuselage 54 and direction Z is perpendicular to directions X and Y. We will assume here that the longitudinal axes of the fuselage and of the engines are parallel. These axes may be different for an industrial application. In this case, either reference can be chosen.

We consider that the engine 56 operates at a given constant speed of rotation.

The inertial unbalance vibrations appearing in the engine 56 are not all transmitted to the mast in the same way. Depending on the orientation of the unbalance forces along axes X, Y and Z, the vibrations will be more or less well transmitted by the mast to the fuselage 54.

In this case, we first select the direction in which the vibrations appearing in the engine are the least well transmitted to the fuselage 54. It is the direction of lowest transmissivity. This direction 63 corresponds in this case to direction Z of the XYZ coordinate system. Selection is carried out for example by modeling and numerical analysis.

Then, when the aircraft is operating, the synchrophasing of the two rotors of the engine 56 is controlled such that the major axis 68 of the ellipse of unbalances of this engine extends in direction Z.

Consequently, in the fuselage 54, for example at a specific site of the fuselage, the vibrations generated by the engine 56 have minimum intensity since they have been poorly transmitted by the mast.

The same transmissivity direction analysis is carried out on the other engine 56 and the latter controlled in a similar way such that the major axis of the corresponding ellipse is oriented in the direction in which the vibrations are the least well transmitted from this other engine to the fuselage 54.

We therefore see that, in this embodiment, each engine is processed independently of the other in order to minimize the vibrations that each one transmits to the fuselage.

Figure 8:
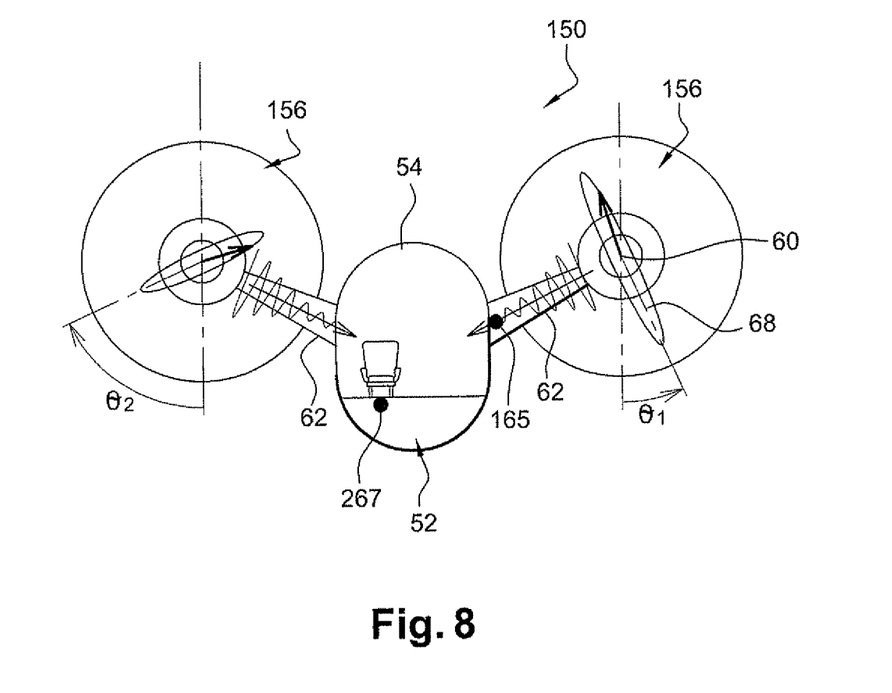

In reference to FIG. 8, in a second embodiment, to choose the direction of the major axis 68 of the ellipse of engine 156 shown on the right of the figure, this time the vibrations felt by a sensor such as an accelerometer 165 placed at a predetermined site of the aircraft are taken into account. In this example, this sensor is located at the end of the mast 62 adjacent to the fuselage 54. This sensor is used to determine the direction of the major axis 68 for which the vibrations measured by the sensor are lowest.

This determination can be carried out during preliminary tests on the engine when the aircraft is stationary. In a variant, it can be carried out when the aircraft is in flight, for example during commercial service. In another variant, at least one first determination is carried out during preliminary tests on the engine when the aircraft is stationary, then at least one other determination is carried out when the aircraft is in flight, for example during commercial service, for example to refresh the determination of the best orientation.

Then, during the synchrophasing control, the major axis is positioned in this direction. Transmission of vibrations to the fuselage 54 is therefore minimized.

The same procedure is carried out for the other engine 156 shown on the left of FIG. 8 using another sensor placed on the corresponding mast. Preferably, a process for minimizing each unbalance will have been carried out before implementing the synchrophasing.

In this embodiment therefore, two angles 01 and 02 are identified, indicating the inclination of the major axis of the ellipse of the respective engines with respect to a fixed direction of the supporting structure, for example the vertical direction. These two angles could quite easily have different values. On the drawing, we see that the major axis associated with the engine shown on the left of the figure is more inclined with respect to the vertical than that of the engine shown on the right. As in the previous embodiment, we act at source to reduce the vibrations felt in the fuselage 54.

In a third embodiment also described in reference to FIG. 8, the vibrations seen from the fuselage using a single sensor for the two engines are analyzed. This time therefore, a sensor 267 is positioned at a predetermined location such as a critical area of the fuselage, for example at the lower part of the cabin designed to take passenger seats. We then determine which combination of the angles 01 and 02 of the major axes 68 of the ellipses gives the lowest level of vibrations measured by the sensor 267. Once again, the values of 01 and 02 may be different from each other, including in absolute value. The best combination of angles 01 and 02 is therefore selected. Then, during synchrophasing, the major axes of the ellipses are oriented in these preferred inclinations.

As with the second embodiment, the angles 01 and 02 can be determined during preliminary tests on the engine when the aircraft is stationary. In a variant, it can be determined when the aircraft is in flight, for example during commercial service. In another variant, at least one first determination is carried out during preliminary tests on the engine when the aircraft is stationary, then at least one other determination is carried out when the aircraft is in flight, for example during commercial service, for example to refresh the determination.

In another embodiment, a combination of angles 01 and is chosen for which those of the unbalance forces generating impacts, i.e. the oscillating forces, are oriented parallel to one of the main inertia planes of the supporting structure, for example in this plane. The inertia planes will be for example planes of symmetry of the supporting structure. The latter will be the entire aircraft or the structure supporting the engine locally, such as the mast. The impact of the vibrations appearing in the two engines will therefore be significantly reduced. The structure is in fact relatively insensitive to the vibrations exerted in such a plane or parallel to this plane. Several combinations of the angles 01 and 02 may be suitable. The plane of lowest inertia of the mast (which could for example include the direction of low transmissivity) could also be chosen. In this case, the vibrations will be minimized in the rest of the aircraft. The direction of lowest transmissivity could in fact be determined using the determination of this plane of lowest inertia of the mast.

For highly dissymmetric structures (such as some masts), the inertia plane with the largest inertia modulus could be chosen. This will be the case for example in aircraft whose propulsion system is supported by a radial mast.

In another embodiment, the major axes 68 of the ellipses of the engines 156 are oriented such that the impact forces and the moments of the two engines act along the same line or along the same lines but in opposite directions on the two engines so that they compensate each other as seen from the supporting structure, in particular from the fuselage 54. This embodiment will be adapted when the aircraft comprises several propulsion systems installed symmetrically on the aircraft structure.

Figure 9:
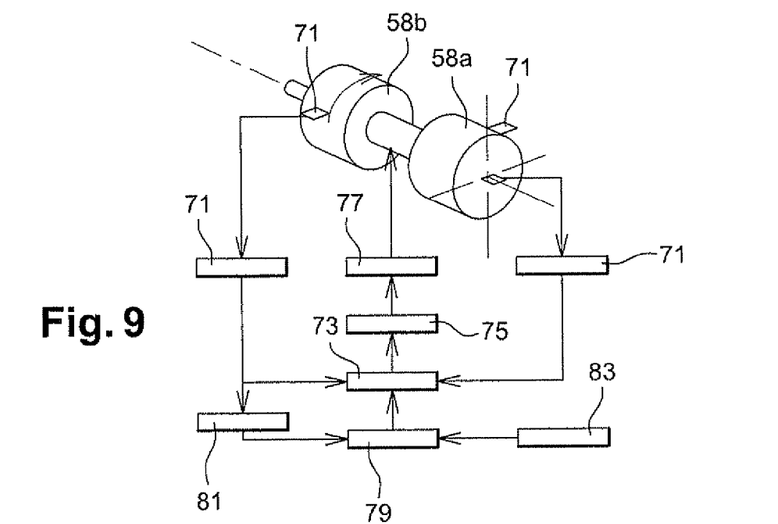
FIGS. 9, 10 and 11 are diagrams showing different embodiments of the architecture for controlling the engines in the aircraft of FIGS. 7 and 8.

FIG. 9 shows the two contra-rotating rotors 58a and 58b of one of the engines 56 and 156 and the principle of an architecture for controlling the synchrophasing for each of the above-mentioned embodiments. We consider in this case that the front rotor 58a is the master rotor. It is controlled such that its speed and power have the values required by the engine operation. The rear rotor 58b is in this case considered to be the slave rotor. Its speed of rotation is continuously adjusted to reduce the difference between its speed of rotation and that of the master rotor. In addition, the phase difference between the two rotors, i.e. the orientation of the major axis 68 of the ellipse, is selected as indicated above in order to reduce the vibrations. The invention may also be implemented when the master rotor is the rear rotor and the front rotor is slave.

We first try to ensure that the two rotors have the same speed of rotation. The respective speeds of rotation of the two rotors are therefore measured with tachometers 71 attached to the two rotors. The information recorded by the tachometers is transmitted to a speed control module 73 which calculates the difference in speeds of rotation by calculating the difference between the inputs supplied by the two tachometers. The module 73 may include, as in this case, a suitable dynamic compensation algorithm in order to generate a corrective signal which is transmitted to a signal power amplifier 75. The signal leaving the latter is transmitted to a unit 77 controlling the pitch of the rear rotor 58b, which controls this rotor. Depending on the application, the control may consist of a flow of fuel or a pitch control system, or both. The speed of the rear rotor is therefore adjusted so that it is as close as possible to that of the front rotor.

The difference in phase angle between the two rotors is then adjusted to set the orientation of the major axis of the ellipse with respect to the fixed coordinate system, for example the coordinate system related to the supporting structure. A sensor 83 sensitive to the vibrations is therefore placed near the engine and the vibration intensity values it records are transmitted to a sampling and time-delay module 79 which transmits them to module 73 so that they can also be taken into account. In addition, data from the tachometer 31 associated with the rear slave rotor 58b is transmitted to a pulse generator 81 also connected to the module 79.

The speeds of rotation of the rotors and their phase difference are therefore measured and adjusted. The angle controlling the optimum direction of the major axis of the ellipse must now be determined. This angle is calculated by the module 73. Calculation is carried out using the principles described above. Synchrophasing is then implemented, taking this value into account.

In the embodiments where vibration sensors are used, there is no need to calculate unbalance force vectors.

Cases where only inertial unbalances are taken into account have been described above. Similarly, the aerodynamic unbalances could be ignored. Lastly, for at least one of the engines, the inertial unbalances as well as the aerodynamic unbalances of this engine can be taken into account. In this case, we determine angle θ1i of the inertial unbalance ellipse and angle θ1a of the aerodynamic unbalance ellipse. We then select an optimum phase or angle θ1, intermediate between these two phase solutions consisting of the inertia phase solution and the aerodynamic phase solution. The engine will then be controlled to direct the major axes of the ellipses in this intermediate direction. This limits the vibrations produced in the aircraft supporting structure. In particular, the moment located outside the plane and generated by the radial forces and the lever arm between the two discs can be used to compensate the moment generated outside the plane by the aerodynamic unbalance (due to the forces parallel to the axis exerted on the two discs at a point offset with respect to their center of rotation).

Figure 10:
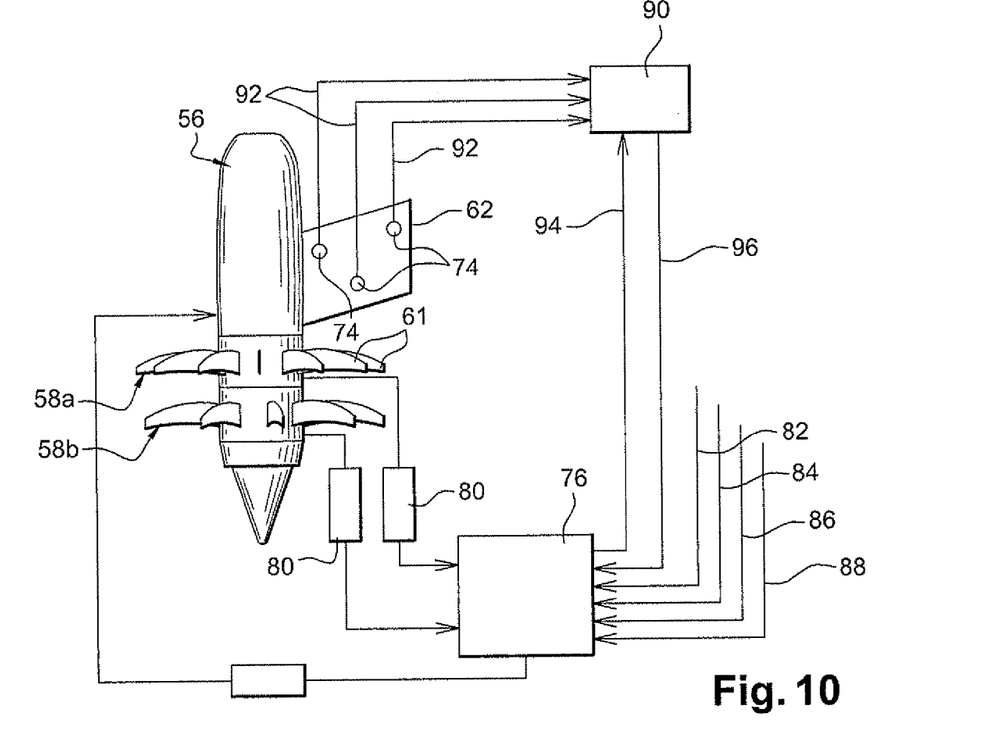

FIG. 10 shows an embodiment of the control architecture used in the case of the invention to control a single engine, whether the aircraft comprises this engine alone or whether it comprises two engines controlled individually.

Each engine is associated with mast accelerometers 74, distributed on the mast 62. In this case, there are three accelerometers, two near a front edge of the mast and one near the rear edge.

The aircraft comprises control means 76 formed in this case by an EEC (Electronic Engine Controller) type unit. The unit 76 is connected by lines 80 to traditional components of the propellers by which the unit receives information concerning the position in degrees and speed in revolutions per minute of the propeller. The unit 76 also receives via respective lines 82, 84, 86 and 88 data concerning the air, the air sampling request, the thrust request and the aircraft at cruising speed.

Lastly, the aircraft comprises a synchrophasing unit 90 forming in this case the module 73 shown on FIG. 9. It is connected by lines 92 to the three respective accelerometers 74 to receive acceleration data from them indicative of the vibrations running through the mast 62. The unit 90 is also connected by a line 94 to the control unit 76 to receive position and speed data concerning each propeller 58a and 58b. A line 96 allows the synchrophasing unit to transmit speed setpoints for the front and rear propellers to the control means.

The unit 76 can control a flow in a fuel circuit to adjust the phase of each propeller. The unit 76 therefore takes into account the data received to control the fuel flow in the engine and the pitch of the front and rear propellers, via the line 77 connecting it to the engine.

The units 76 and 90 each form microprocessor electronic control means comprising at least one program stored on a data storage medium such as a hard disk or flash memory. At least one of the programs includes code instructions capable of controlling implementation of all or part of the method according to the invention when it is executed on these means forming a computer.

Lines 82, 84, 86, 88, 94 and 96 are part of the aircraft onboard data communication network. It is for example an AFDX (Avionics Full Duplex Switch) type network.

Figure 11:
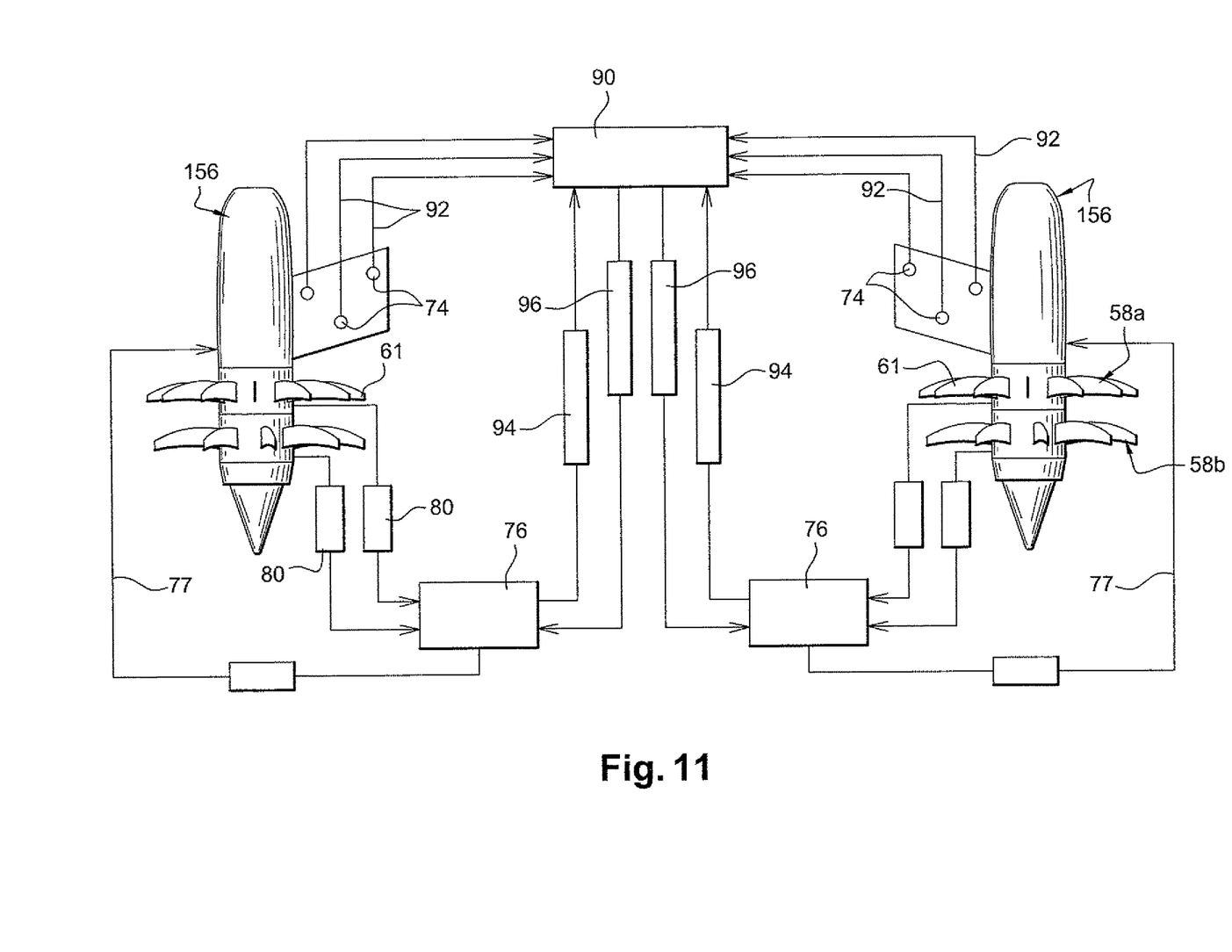

Lastly, FIG. 11 shows an embodiment of the control architecture of two engines of an aircraft according to the invention when they are controlled together. Since the components are the same as those shown on FIG. 10, they will not be described again. In this case, the synchrophasing unit 90 is common to the two engines 156, whereas each engine has its own control unit 76 which receives the data already described and which has not all been shown. The two lines 94 of the respective engines lead to the unit 90, while the two lines 96 of the respective engines leave it to lead to the respective units 76. The unit 90 is responsible for synchrophasing the two engines according to the invention and transmits the necessary commands to the control units 76.

We can see that the invention confines the vibrations in the area of the source producing them. The invention takes advantage of the natural intrinsic behavior of the aircraft structure to dampen the vibrations generated by the engines. In particular, whenever possible, the invention aims to optimize the direction of the vibrations and to orient the vibrations in the preferred direction to minimize the effect, especially within the fuselage. The result is that, overall, the main supporting structure absorbs less energy than in the prior art. Dampening is effective and implements a small number of sensors.

Obviously, numerous modifications can be made without leaving the scope of the invention.

The direction of lowest transmissivity could be different from direction Z, to which it corresponds on FIG. 7. It will depend on the aircraft architecture.

The invention is applicable to engines comprising more than two rotating parts independent from each other.

The invention claimed is:

1. Aircraft comprising at least one engine having contra-rotating rotors, the engine or at least one of the engines having unbalances able to generate forces such that, when an addition of the forces is represented by a vector, the vector forms an ellipse, the aircraft comprising means capable of controlling the engine or at least one of the engines such that, at a given engine speed, the major axis of the ellipse or at least one of the ellipses extends in a direction for which vibrations generated by the engine or engines have a minimum intensity in at least one predetermined site, particularly in a predetermined area, of the aircraft.

2. Aircraft according to claim 1, wherein the control means are able to control the engine or at least one of the engines such that the major axis of the ellipse or at least one of the ellipses extends in a direction (Z) of lower vibration transmissivity in a structure supporting the engine.

3. Aircraft according to claim 1, wherein there are at least two engines and the control means are able to control the engines such that a resultant of the vibrations generated by the engines has minimum intensity at the predetermined site.

4. Aircraft according to claim 1, wherein there are at least two engines and the control means are able to control at least one of the engines such that vibrations generated by the engine itself have minimum intensity at the site.

5. Aircraft according to claim 4, wherein the site is specific to the engine and the control means are able to control the other engine such that the other engine is associated with at least one other predetermined site at which the vibrations generated by this other engine itself have minimum intensity.

6. Aircraft according to claim 1, wherein the control means are able to control the engine or at least one of the engines such that unbalance forces of the rotors are exerted parallel to an inertia plane of a structure supporting the engine, for example a main inertia plane or the inertia plane which has the largest inertia modulus.

7. Aircraft according to claim 1, wherein there are at least two engines and the control means are able to control the engines such that unbalance forces and/or unbalance moments of the respective engines exerted on the aircraft compensate each other at least partially.

8. Method for controlling an aircraft comprising at least one engine having contra-rotating rotors, the engine or at least one of the engines having unbalances able to generate forces such that, when an addition of the forces is represented by a vector, the vector forms an ellipse, wherein the engine or at least one of the engines is controlled such that, at a given engine speed, the major axis of the ellipse or at least one of the ellipses extends in a direction for which vibrations generated by the engine or engines have a minimum intensity in at least one predetermined site of the aircraft.

9. Computer program comprising instructions capable of controlling execution of a method according to claim 8 when it is executed on a computer.

10. Data storage medium, comprising a program according to claim 9.

* * * * *